United States Patent Office 2,904,565
Patented Sept. 15, 1959

2,904,565
SEPARATION OF STEROID MIXTURES

Alan Gibson Long and William Graham, Greenford, England, assignors to Glaxo Laboratories Limited, Greenford, England, a British company No Drawing. Application February 11, 1958
Serial No. 714,491

Claims priority, application Great Britain
February 15, 1957

5 Claims. (Cl. 260—397.45)

This invention is concerned with improvements in or relating to the separation of steroid mixtures containing on the one hand 4-bromo-3-keto-4:5α-dihydrosteroids and on the other hand 2-bromo-3-keto-4:5α-dihydrosteroids and/or 3-keto-4:5α-dihydrosteroids. These steroids have the following structures in ring A:

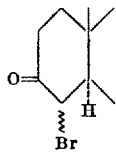

4-bromo-3-keto-4 : 5α-dihydrosteroid

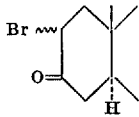

2-bromo-3-keto-4 : 5α-dihydrosteroid

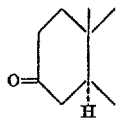

3-keto-4 : 5α-dihydrosteroid where the bromine atoms may have either the α- or β-configuration.

Various steriods of physiological importance possess in ring A a characteristic 3-keto-Δ$^4$-structure and in the synthesis of such compounds from intermediates in the allo series the elaboration of such structure in ring A is not straightforward. Thus while mono-bromination of a 3-keto-4:5β-dihydrosteroid takes place in the 4 position (giving a 4-bromo compound which can be directly dehydrobrominated to introduce a double-bond in the 4-position), in the allo series a 2-bromo compound is formed. One of the known ways of introducing a double bond in the 4-position of a 3-keto-4:1α-dihydrosteroid involves bromination to yield a 2:4-dibromo compound, reaction of the latter with sodium iodide to yield a 2-iodo-3-keto-Δ$^4$-compound followed by subsequent removal of the 2-iodo atom by reduction.

U.S. Patent No. 2,824,100 describes the preparation of 4-bromo-3-keto-4:5α-dihydrosteroids by the reduction of 2:4-dibromo-3-keto-4:5α-steroids, the resultant 4-bromo compounds being convertible by dehydrobromination to 3-keto-Δ$^4$-compounds. However, the reduction of 2:4-dibromo-3-keto-4:5α-steroids as described in said patent gives rise to a mixture which, as there described, may be separated by fractional crystallisation.

An object of the present invention is to provide an improved method of separating mixtures of steroids such as arise in the production of 4-bromo-3-keto-4:5α-dihydrosteroids by the reduction of 2:4-dibromo-3-keto-4:5α-dihydrosteroids as described in U.S. Patent No. 2,824,100. A further object of the invention is to provide an improved method of producing 3-keto-Δ$^4$-steroids from 3-keto-4:5α-dihydrosteroids.

4-bromo-3-keto-4:5α-dihydrosteroids as produced for example by the reduction step of said prior U.S. Patent No. 2,824,100 are often found to be accompanied by the corresponding 2-bromo-isomers and/or the fully reduced 3-keto-4:5α-compound; both of these types of compounds are of course very similar in structure, and hence properties, to the desired 4-bromo compound with the result that the latter is difficult to isolate and purify. We have now found however, and the present invention is based on this discovery, that while certain 3-keto-4:5α-dihydrosteroids and the corresponding 2-bromo-3-keto-4:5α-dihydrosteroids both readily form complexes with bisulphite ions that are soluble in various aqueous media, the corresponding 4-bromo-3-keto-4:5α-dihydrosteroids do not readily form such complexes or do so only very slowly. The principle thus of the present invention involves the reaction of a mixture containing a 4-bromo-3-keto-4:5α-dihydrosteroid of the general formula set out below together with the corresponding 2-bromo-3-keto-4:5α-dihydrosteroid and/or the corresponding 3-keto-4:5α-dihydrosteroid with bisulphite ions to form the bisulphite complexes of the last mentioned compounds and separating the desired unreacted 4-bromo compound from said bisulphite complexes by difference in solubility in aqueous media.

According to the present invention, therefore, there is provided a process for the separation of a mixture containing on the one hand a 4-bromo-3-keto-4:5α-dihydrosteroid of the formula

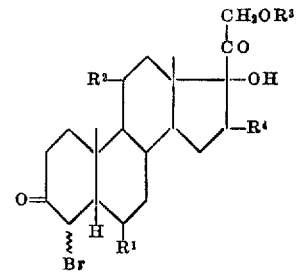

in which $R^1$ is a hydrogen atom or an alkyl, particularly methyl, group $R^2$ is a hydroxyl group or, particularly, a ketonic oxygen atom $R^3$ is a hydrogen atom or an acyl, particularly acetyl, group and $R^4$ is hydrogen or an acyloxy, particularly acetoxy, group, and on the other hand the corresponding 2-bromo-3-keto-4:5α-dihydrosteroids and/or the corresponding unbrominated 3-keto-4:5α-dihydrosteroids which comprises reacting the mixture with a substance furnishing bisulphite ions to form a water-soluble derivative of the 2-bromo-3-keto-4:5α-dihydrosteroid and/or a water-soluble derivative of the corresponding unbrominated 3-keto-4:5α-dihydrosteroid and separating unreacted 4-bromo-3-keto-4:5α-dihydrosteroid from said water-soluble derivative(s) by difference in solubility in aqueous media.

The formation of the bisulphite complexes of the 2-bromo- and unbrominated compounds preferably takes place in aqueous media. Water by itself may be used but we prefer to use water containing a water-miscible organic solvent, as the bisulphite complexes, particularly of the 2-bromo compounds, are not highly soluble in water alone. The use of water/water-miscible organic solvent mixtures thus facilitates the separation. Suitable water-miscible organic solvents include water-miscible alcohols e.g. methanol, ethanol, isopropanol, also dioxan and acetonitrile.

Where the reaction with bisulphite ions is carried out in aqueous media, the unreacted 4-bromo compound is readily separated in solid form by simple filtration of the reaction mixture leaving in the filtrate the bisulphite addition compounds of the 2-bromo-3-keto-4:5α-dihydrosteroid and of the corresponding unbrominated ketone.

The substance furnishing bisulphite ions may conveniently be a meta bisulphite (i.e. a substance containing the group $S_2O_5^=$) of which alkali metal or ammonium metabisulphites are preferred since these have the desired water-solubility characteristics, we particularly prefer to use sodium, potassium or ammonium metabisulphite. It is of course well known that metabisulphites in the presence of water give rise to bisulphite ions.

The pH at which the starting mixture of steroids is reacted with the substance furnishing bisulphite ions is important. Thus many steroids are known to be sensitive to extremes of pH and therefore the reaction should be carried out at a pH at which the steroid reactants are substantially stable; the pH used should also be one at which bisulphite ions may exist. In general a pH between 4 and 8 is satisfactory.

In a preferred method of carrying out the invention the mixture which it is desired to treat is suspended in a water-miscible solvent such as, for example, acetonitrile, dioxan or ethanol, the bisulphite-ion yielding substance added in aqueous solution and the mixture reacted. The water-miscible solvent that we prefer to use is ethanol and it is desirable to use a concentration of sodium metabisulphite in water such that on mixing with ethanol in the chosen proportion no precipitation of the salt occurs. A concentration of 10–20% of sodium metabisulphite has been found to be suitable.

In an alternative manner of carrying out the invention the steroid mixture being treated may first be suspended in an aqueous water-miscible organic solvent and solid bisulphite added.

In general, we have found that somewhat elevated temperatures are desirable for the reaction between the steroid mixture and the compound furnishing bisulphite ions to proceed at a reasonable rate. Thus, temperatures between 40° and 100° C. or to the boiling point of the liquid medium solvent used are, in general, satisfactory. The reaction is normally completed by heating at a temperature within the aforesaid range for a time of 15–30 minutes. Once the bisulphite derivatives have been formed in, for example, aqueous ethanol, the mixture may be diluted with a fairly large volume of water without precipitating the bisulphite derivatives.

Since the formation of bisulphite complexes of ketones is a reversible reaction, it is generally desirable to employ an excess of bisulphite over the theoretical requirements, to ensure adequate completion of the reaction. We prefer to employ an excess of 4–16 equivalents of bisulphite ion for each molecular proportion of steroid in the mixture treated.

As stated above the present invention is based on the observation that 2-bromo-3-keto-4:5α-dihydrosteroids and 3-keto-4:5α-dihydrosteroids readily form complexes with bisulphite ions whilst 4-bromo-3-keto-4:5α-dihydrosteroids do not readily do so. In general it is possible to form a bisulphite complex of the 4-bromo compound under severe conditions, e.g. by the use of an extreme excess of bisulphite ions, prolonged reaction time and/or increased reaction temperatures. The relative ease with which the 2-bromo and unbrominated compounds form bisulphite complexes as compared with the 4-bromo compound is so marked that it is in practice easy to select conditions whereby the 2-bromo and/or unbrominated compounds react as described without affecting the 4-bromo compound.

It may be found convenient when filtering off the unreacted 4-bromo-3-keto steroid in the process according to the invention to add a filter aid, for example, kieselguhr. The 4-bromo-3-keto steroid may then be extracted from its mixture with kieselguhr, or other filter aid, by heating with ethyl acetate, hot filtering the mixture and cooling the filtrate, whereupon substantially pure 3-keto-4-bromo steroid is obtained.

The 2-bromo and/or unbrominated substances may be regenerated from the dissolved bisulphite compounds by decomposition with, for example, acid or a solution of an alkali metal carbonate or bicarbonate. The resultant mixture of 2-bromo-3-keto-4:5α-dihydrosteroid and/or the corresponding unbrominated ketone may then be brominated to form the 2:4-dibromo-3-keto-4:5α-dihydrosteroid which can then be recycled. Alternatively, the 2-bromo-3-keto-4:5α-dihydrosteroid may be reduced, in the presence of any corresponding unbrominated ketone, to form the corresponding unbrominated ketone which may then be brominated to form the starting 2:4-dibromo-3-keto-4:5α-dihydroallosteroid. It will therefore be appreciated that the contaminating substances present in the original mixture can be recovered and, after suitable treatment, recycled thus adding to the gross yield of the desired 4-bromo compound.

The separation process according to this invention is very effective when applied to the crude reaction product obtained by the reduction of a 2:4-dibromo-3-keto-4:5α-dihydrosteroid by the method of U.S. Patent No. 2,824,100 and thus enables 4-bromo-3-keto-allosteroids to be obtained from 2:4-dibromo-allosteroids by a simplified technique. Bearing in mind that the resulting 4-bromo compounds may be readily dehydrobrominated to yield 3-keto-$\Delta^4$-steroids, it will be appreciated that the present invention serves to improve the production of steroids of the last mentioned type. The invention thus specifically includes the production of 3-keto-$\Delta^4$-steroids by reducing a 2:4-dibromo-3-keto-4:5α-dihydrosteroid to yield a crude mixture containing a 4-bromo-3-keto-4:5α-dihydrosteroid of the general formula set out above, separating said 4-bromosteroid from the crude mixture, in accordance with the present invention, and dehydrobrominating the resultant 4-bromo compound to yield a 3-keto-$\Delta^4$-steroid.

The process according to the invention is of particular value in the separation of 4-bromo-4:5α-dihydrocortisone and its esters from mixtures containing it together with 2-bromo-4:5α-dihydrocortisone and/or its esters and/or 4:5α-dihydrocortisone and/or its esters. Such separation is of particular importance in the production of cortisone and its esters from 2:4-dibromo-4:5α-dihydrocortisone ester, by the methods described in U.S. Patent No. 2,824,100.

In order that the invention may be well understood, the following examples are given by way of illustration only:

EXAMPLE 1

*The preparation of 21-acetoxy-4-bromo-17α-hydroxy-5α-pregnane-3:11:20-trione (4-bromo compound)*

BROMINATION AND REARRANGEMENT

Finely divided 4:5α-dihydrocortisone acetate (100 g.) was suspended in glacial acetic acid (1150 mls.) with stirring and a solution of hydrogen bromide in glacial acetic acid (6.3 N: 80 mls.) added. The suspension was cooled to 16° C. and a solution of bromine (26.4 mls.) in glacial acetic acid (800 mls.) added over 8 minutes. The coolant was removed and the stirring continued for a further 15 minutes. After this period the air in the reaction vessel and in the reaction mixture was displaced by carbon dioxide and this inert atmosphere was maintained throughout the remainder of the reaction.

SEMI-DEBROMINATION

Vigorous stirring was continued whilst an aqueous solution of chromous chloride (356 mls.: 1.7 4 N) was added over a period of 85 minutes and the reaction was completed by stirring for a further 15 minutes. Warm methylene chloride (1200 mls.) was added, followed by warm water (ca. 40° C.) (5 litres) from a dropping funnel over a period of ca. 5 minutes. The layers were separated and the aqueous phase extracted with warm methylene chloride (3 x 400 mls.). The first three extracts were combined and washed successively with water (800 mls.), saturated aqueous bicarbonate solution (800 mls.) and water (800 mls.), the washes being successively re-extracted with the fourth methylene chloride extract. The temperature was maintained at ca. 35–40° C. throughout, to prevent crystallisation of the monobromides. The bulked organic layers were distilled to dryness under reduced pressure.

SEPARATION OF 4-BROMO-COMPOUND BY BISULPHITE

The resulting solid was suspended in industrial methylated spirit (1200 mls.) and treated with 10% aqueous sodium metabisulphite solution (1440 mls.) at 60° C. for 15 minutes. The suspension was diluted with water (3.6 litres) and cooled to room temperature. The solid was removed by filtration through a kieselguhr pad and washed with 70% aqueous industrial methylated spirit (2 x 200 mls.). The damp solid cake was refluxed with ethyl acetate (3.6 litres) for 30 minutes and the kieselguhr removed by hot filtration. The filtrate was concentrated to a final volume of approximately 1 litre and crystallisation was completed at 0° C. overnight. The solid was filtered off, washed with a little ethyl acetate and dried and desolvated in an oven at not less than 100° C. in vacuo.

Yield of 21-acetoxy-4-bromo-17-hydroxy-5α-pregnane-3:11:20-trione: 58.4 g. (48.5%) $[\alpha]_D$ +62°.

The mother liquors from the crystallisation were evaporated to dryness and the residual solid combined with the recovered 2-bromo compound and 4:5α-dihydrocortisone acetate for debromination.

RECOVERY OF 2-BROMO COMPOUND AND 4:5α-DIHYDROCORTISONE ACETATE

The filtrate was treated with sodium bicarbonate (290 g.) and extracted with ethyl acetate (1 x 1.5 litres, 4 x 500 mls.). The first four extracts were bulked and washed with water (4 x 300 mls.), the washes being re-extracted with the fifth ethyl acetate extract. The bulked ethyl acetate solutions were distilled to dryness under reduced pressure. This material was combined with the solid obtained from the mother liquors of the crystallisation of the 4-bromo compound. Combined yield: 52.5 g. (44% calcd. as a monobromide).

RECOVERY OF 4:5α-DIHYDROCORTISONE ACETATE

The crude solid obtained above was dissolved in acetone (880 mls.) with tartaric acid (44 g.) and sodium iodide (130 g.). The mixture was refluxed for 1 hour, cooled, and poured into sodium bicarbonate (114 g.) and sodium metabisulphite (42 g.) in water (1.5 litres). Water (1.5 litres) was added, the solid precipitate removed by filtration, and the product washed with water (3 x 1 litre). The damp cake was dissolved in refluxing ethyl acetate and the excess solvent removed by distillation at atmospheric pressure until crystallisation began. The mixture was cooled, finally overnight at 0° C., and filtered. The solid was washed with a little ether and dried in vacuo at 100° C.

Wt.=31.6 g. $[\alpha]_D$ +110° ($CHCl_3$), M.P. 229–32° C.

The overall yield of 4-bromo compound allowing for the recovery of this material is 71% of theory.

EXAMPLE 2

*Use of other solvents, temperatures and bisulphites*

A mixture (1 g.) consisting of equal portions of 2α-bromo-4:5α-dihydrocortisone acetate ($[\alpha]_D$ +108°) and 4α-bromo-4:5α-dihydrocortisone acetate ($[\alpha]_D$ +61°) was dissolved or suspended in the solvent at the temperature stated in the table below. A 10% solution of the bisulphite in water was added and the mixture heated. The insoluble fraction was filtered, washed with water (2 x 25 ml.) and dried in vacuo at 110° C. to give the crude 4α-bromo compound.

The aqueous filtrate was treated with sodium bicarbonate (3 g.) and extracted with methylene chloride (2 x 50 ml.). The solvent was removed by distillation and the residual solid dried in vacuo at 110° C. to give the crude 2α-bromo compound.

The following table shows the effect of variation in the solvent system, the temperature at which the separation was performed, and the nature of the bisulphite compound used.

| Solvent | Vol., Mls. | Bisulphite compound | Vol. (10%), Mls. | T.,° C. | Time, mins. | Soluble fraction, g. | $[\alpha]_D$, degrees | Insoluble fraction, g. | $[\alpha]_D$, degrees |
|---|---|---|---|---|---|---|---|---|---|
| Methanol | 40 | Sodium metabisulphite | 24 | 50 | 15 | 0.33 | +103 | 0.67 | +76 |
| Acetonitrile | 25 | ----do---- | 30 | 60 | 20 | 0.48 | +96 | 0.5 | +77 |
| Dioxan | 25 | ----do---- | 30 | 60 | 15 | 0.40 | +111 | 0.53 | +72 |
| Do | 30 | ----do---- | 24 | 92 | 15 | 0.27 | +105 | 0.36 | +77 |
| Isopropyl alcohol | 20 | ----do---- | 24 | 58 | 15 | 0.47 | +100 | 0.51 | +73 |
| Ethanol | 20 | Potassium metabisulphite | 24 | 58 | 15 | 0.33 | +97.5 | 0.6 | +79 |
| Do | 20 | Ammonium metabisulphite | 24 | 50 | 15 | 0.34 | +100 | 0.7 | +79.5 |

EXAMPLE 3

*Separation of 4-bromo-4:5α-dihydrocortisone acetate from a mixture with the 2-bromo analogue and 4:5α-dihydrocortisone acetate.*

4-bromo-4:5α-dihydrocortisone acetate (6 g., $[\alpha]_D$ +61° ($CHCl_3$)) was mixed with 2-bromo-4:5α-dihydrocortisone acetate (3 g., $[\alpha]_D$ +108° ($CHCl_3$)) and 4:5α-dihydrocortisone acetate (3 g., $[\alpha]_D$ +115° ($CHCl_3$)). Ethanol (215 ml.) was added and the mixture was refluxed to dissolve the solids. Aqueous sodium metabisulphite (215 ml., 10%) was added, and the mixture was maintained at 55° C. for 15 minutes. Ice-water (540 ml.) was added, and the mixture was stirred for 10 minutes. The crude product was filtered off (6.78 g.) and was crystallised from ethyl acetate to give substantially pure 4-bromo-4:5α-dihydrocortisone acetate (6.09 g.) $[\alpha]_D$ +64.2° ($CHCl_3$).

The solubilised part of the mixture was recovered by adding sodium bicarbonate (40 g.) to the aqueous filtrate, extracting the liberated steroids with chloroform and distilling to dryness under vacuum. The residue was treated in acetone (200 ml.) with tartaric acid (7.5 g.) and sodium iodide (22 g.), and refluxed for 1 hour.

The mixture was cooled and the liberated iodine was reduced with a solution of sodium bicarbonate (8 g.) and sodium metabisulphite (3 g.) in water (75 ml.). The acetone was removed by vacuum distillation and the product was filtered from the aqueous residue, dried and crystallised from ethyl acetate to give 4:5α-dihydrocortisone acetate (4.95 g.) $[\alpha]_D$ +109.8°, M.P. 230–232° C.

EXAMPLE 4

A solution of 21-acetoxy-11β:17α-dihydroxy-5α-pregnane-3:20-dione (20 g.) in dry tetrahydrofuran (200 ml.) was cooled to 5° C. and, with stirring, treated with a solution of 5 N hydrogen bromide in acetic acid (2 ml.) followed by bromine (16.15 g., 2.06 mol.) added dropwise over 7 minutes. During the addition of the bromine the temperature of the solution was maintained below 10° by externally cooling the reaction flask. The solution was warmed to 20° and maintained at this temperature for 25 minutes. Water (20 ml.) was then added followed by sodium bicarbonate (7 g.) added portionwise to the stirred mixture and finally sodium metabisulphite (0.5 g.). The lower aqueous phase was separated, and the upper organic layer washed with a solution of sodium bicarbonate (8 g.) and ammonium sulphate (50 g.) in water (75 ml.). The first aqueous phase was washed with tetrahydrofuran (75 ml.) and the wash repeated with the second aqueous phase. The organic phases were combined, stirred with sodium sulphate (60 g.) for 1 hour, the sulphate removed by filtration and washed with tetrahydrofuran (4 x 30 ml.), and concentrated, under reduced pressure and below 25° C. to an oil.

The crude bromination product was taken up in glacial acetic acid (300 ml.) and the solution was stirred at 17° C. under an atmosphere of carbon dioxide whilst chromous chloride solution (50.2 ml. 2.47 N) was added over 1 hour. The mixture was poured into ice-water (1500 ml.), stirred for 1 hour, and filtered. A small portion of the crude solid, dried in vacuo at 80° C., had $[\alpha]_D$ +53° (1% $CHCl_3$). The remainder of the crude damp solid was taken up in ethanol (360 ml.) under reflux, and was treated with a solution of sodium metabisulphite (43 g.) in water (430 ml.). The mixture was stirred at 55° C. for 15 minutes, and was then diluted with ice-water (1080 ml.). After being stirred for 10 minutes, the mixture was filtered and was well washed with cold water. The crystalline bisulphite compound so obtained was insoluble in chloroform but was soluble in warm 5% sodium metabisulphite solution. It was decomposed by shaking it in a two phase mixture of chloroform and saturated aqueous sodium bicarbonate solution. The chloroform solution was distilled under vacuum at 28° C. to leave a gum which crystallised from methanol to give solvated prisms of 4-bromo 4:5α dihydrocortisol-21-acetate 1.85 g. M.P. 173° C. (dec.) $[\alpha]_D$ +31.5° (1% $CHCl_3$). Analysis: found, Br 14.2%. $C_{23}H_{33}O_6Br$. $2CH_3OH$ requires Br 14.56%.

We claim:
1. A process for the separation of a water-insoluble steroid compound having the formula

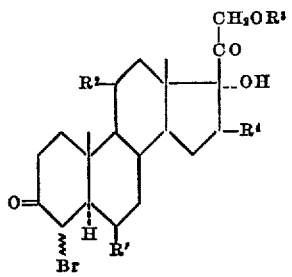

in which $R^1$ is a member selected from the group consisting of a hydrogen atom and a lower alkyl group, $R^2$ is a member selected from the group consisting of a hydroxyl group and an oxygen atom, $R^3$ is a member selected from the group consisting of a hydrogen atom and an acyl group derived from a lower alkanoic acid and $R^4$ is a member selected from the group consisting of a hydrogen atom and an acyloxy group derived from a lower alkanoic acid, from a mixture of said compound with another steroid component comprising at least one water-insoluble steroid compound selected from the group consisting of the 2-bromo and unbrominated compounds corresponding to said first-named steroid compound, which process comprises reacting, at a pH of 4–8 the mixture of water-insoluble steroid compounds with bisulphite ions in aqueous solution, said ions being furnished by a water-soluble inorganic metabisulphite to form a water-soluble derivative of said other steroid component while leaving said first-mentioned 4-bromo steroid compound substantially unchanged; and separating the unreacted 4-bromo steroid compound from the reacted steroid material by difference in water solubility.

2. A process as claimed in claim 1 in which the reaction medium is water alone.

3. A process as claimed in claim 1 in which the reaction medium is water containing a water-miscible lower aliphatic alcohol.

4. A process as claimed in claim 1 in which the metabisulphite is selected from the group consisting of an alkali metal metabisulphite and ammonium metabisulphite.

5. A process as claimed in claim 1 in which the substance furnishing bisulphite ions is used in an amount yielding 4–16 equivalents of bisulphite ions per molecular proportion of total steroid in the starting mixture.

References Cited in the file of this patent
UNITED STATES PATENTS
2,720,481   Leanza et al. _____ Oct. 11, 1955